United States Patent [19]

Bingham

[11] Patent Number: 5,096,610

[45] Date of Patent: Mar. 17, 1992

[54] FLOOR FINISH REMOVER COMPOSITIONS

[75] Inventor: Mary E. Bingham, Santa Ana, Calif.

[73] Assignee: Atochem North America, Inc., Philadelphia, Pa.

[21] Appl. No.: 609,675

[22] Filed: Nov. 6, 1990

[51] Int. Cl.⁵ .................. C11D 7/22; C11D 7/32; B08B 7/00
[52] U.S. Cl. ........................ 252/162; 134/38; 134/39; 134/40; 252/153; 252/170; 252/171; 252/DIG. 8
[58] Field of Search ............... 252/153, 162, 170, 171, 252/DIG. 8; 134/38, 39, 40

[56] References Cited

U.S. PATENT DOCUMENTS

| | | | |
|---|---|---|---|
| 4,081,395 | 3/1978 | Talley | 252/534 |
| 4,678,605 | 7/1987 | Geke et al. | 252/547 |
| 4,814,108 | 3/1989 | Geke et al. | 252/545 |
| 4,857,114 | 8/1989 | Brumbaugh et al. | 252/DIG. 14 |
| 4,915,864 | 4/1990 | Kita et al. | 252/132 |

*Primary Examiner*—Paul Lieberman
*Assistant Examiner*—William S. Parks

[57] ABSTRACT

A floor finish remover composition containing a solvent, water, and an organosilicon complex formed from a silicate such as sodium metasilicate and a linear, 6-10 carbon, organic compound such as sodium n-octane sulfonate.

6 Claims, No Drawings

FLOOR FINISH REMOVER COMPOSITIONS

FIELD OF THE INVENTION

This invention relates to compositions useful for removing floor finishes, especially to improved compositions containing an organosilicon complex.

BACKGROUND

Conventional floor finish strippers have employed amines (such as ammonia, ethanolamines, or diethylamine) or organic solvents (such as ethylene glycol monobutyl ether). Such solvent-only formulations have resulted in sluggish removal of the finish (typically an acrylic, acrylic-styrene or polyurethane polymer) and incomplete removal, so that two or more applications of the stripping solutions were often required. The floor dwell time for such solvents to dissolve polymer floor finishes is typically 5 to 10 minutes. Thus, the industry is in need of compositions which will accelerate the removal of floor finishes and increase the efficiency of the solvents in the formulation.

SUMMARY OF THE INVENTION

A floor finish remover composition is provided containing (a) a conventional solvent selected from amines, glycol ethers, and mixtures thereof, (b) water, and (c) an organosilicon complex formed from a silicate such as sodium metasilicate and a linear, 6–10 carbon (optimally, 8 carbon), organic compound such as caprylic acid or sodium n-octane sulfonate. The formulations may be tailored for either machine or mop-on, mop-off application, the latter strippers generally having higher solvent concentrations and pH.

DETAILED DESCRIPTION OF INVENTION

It has now been found that the addition of a linear, 6–10 carbon, organic compound in the presence of silicates, or metasilicates, accelerates floor finish removal and solvent efficiency. The addition of an organic such as n-octane sulfonate (preferably sodium n-octane sulfonate) or caprylic acid to metasilicate (preferably sodium metasilicate) results in the formation of an organosilicon complex. When incorporated in conventional solvent-containing formulations the floor dwell time (to dissolve the finish) can be reduced to as little as 1–2 minutes and finish removal can be accomplished in one application.

The solvents can be of the conventional type such as amines (typically diethanolamine, diethylamine, or, preferably, monoethanolamine) and/or one or more glycol ethers (preferably ethylene glycol monobutyl ether and/or ethylene glycol phenyl ether). The solvents generally comprise about 10–30% by weight of the formulation, more typically about 13–24%. Water generally comprises about 50–84% of the formulation, more typically about 58–77%.

The silicate generally comprises about 4–8% of the formulation, more typically about 5 to 7.2%. The organic compound generally comprises 1 to 30% (more typically about 2.9 to 8%) and may contain 6–10 carbons such as caproic acid, decylenic acid, caprylic acid, or alkali salts such as sodium n-octane sulfonate. Sodium hydroxide, silicates, and/or alkali salts are present in such formulations to keep the pH elevated and to prevent calcium deposits. Conventional surfactants (such as fluorinated alkyl polyoxethylene ethanols—available commercially, for example, as FLUORAD FC-170-C, a product of the 3M Company) and dyes are also optionally added in minor amounts. For mop-on, mop-off applications, sodium xylenesulfonate may be added to assist in solubilization.

Typical formulations for mop-on, mop-off (A) and machine (B) applications are as follows (in percent by weight)

| Ingredient | A | B |
|---|---|---|
| Caprylic acid | — | 2.9% |
| Sodium n-octane sulfonate (40%) | 8% | — |
| Sodium metasilicate (60%) | 5% | 7.2% |
| Monoethanolamine | 7% | 4% |
| Ethylene glycol monobutyl ether | 5% | 9% |
| Ethylene glycol phenyl ether | 12% | — |
| Water | 58.5% | 76.9% |
| FC-170-C Fluorosurfactant | 0.1% | — |
| Sodium Xylenesulfonate (40%) | 4.4% | — |

What is claimed is:

1. A floor finish remover composition comprising effective amounts of (a) a solvent selected from diethylamine, diethanolamine, monoethanolamine, ethylene glycol monobutyl ether, ethylene glycol phenyl ether, and mixtures thereof, (b) water, (c) a metasilicate and (d) a linear, 6–10 carbon, organic compound selected from caprylic acid, n-octane sulfonate, caproic acid, decylenic acid, and their alkali salts.

2. The composition of claim 1 further comprising (e) surfactant.

3. The composition of claim 1 wherein the organic compound comprises about 1 to 30% by weight of the composition.

4. The composition f claim 3 wherein the silicate is sodium metasilicate and the organic compound is selected from caprylic acid and sodium n-octane sulfonate.

5. A floor finish remover composition consisting essentially of monoethanolamine, ethylene glycol monobutyl ether, water, caprylic acid, and sodium metasilicate.

6. A floor finish remover composition consisting essentially of monoethanolamine, ethylene glycol monobutyl ether, ethylene glycol phenyl ether, water, sodium metasilicate, sodium n-octane sulfonate, sodium xylenesulfonate, and a fluorinated alkyl polyoxethylene ethanol.

* * * * *